United States Patent Office.

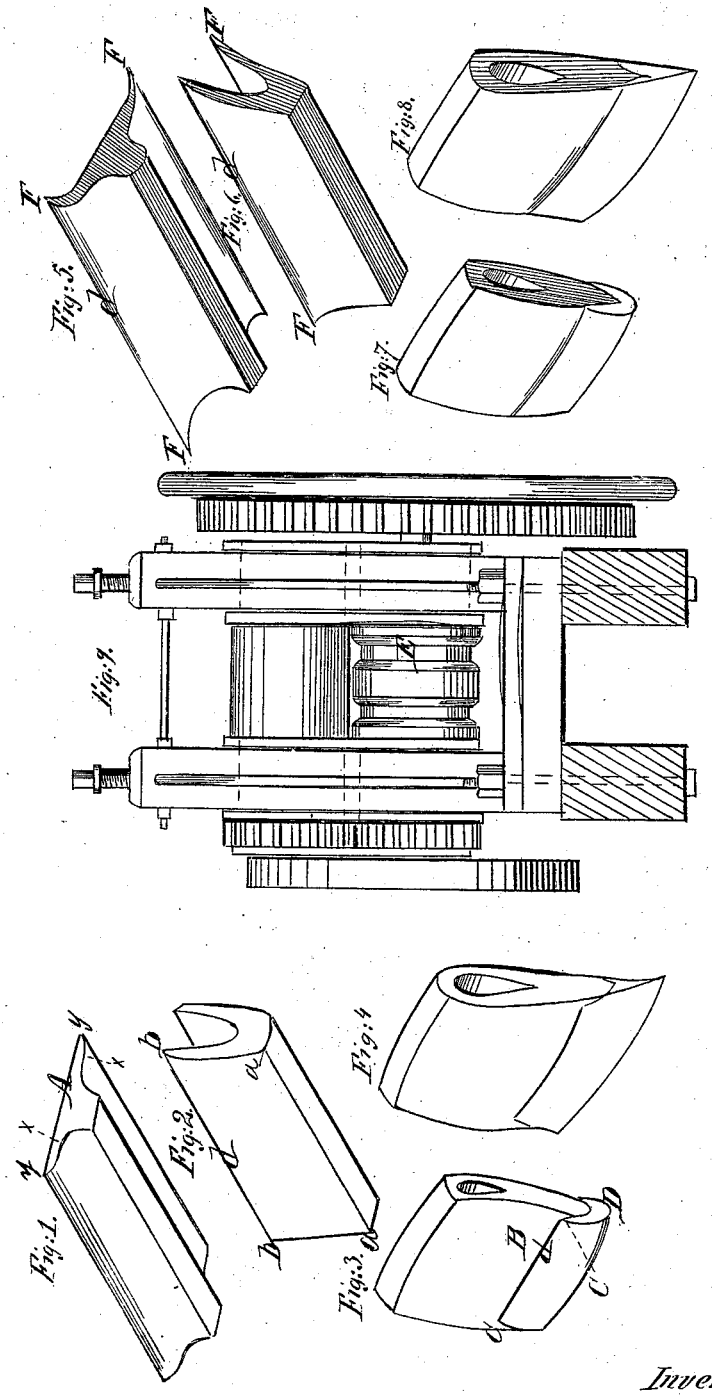

CHARLES BLAIR, OF COLLINSVILLE, CONNECTICUT, ASSIGNOR TO THE COLLINS COMPANY, OF SAME PLACE.

Letters Patent No. 93,666, dated August 17, 1869.

IMPROVEMENT IN MANUFACTURE OF AXE-BITS.

The Schedule referred to in these Letters Patent and making part of the same.

*To all whom it may concern:*

Be it known that I, CHARLES BLAIR, of Collinsville, in the county of Hartford, and State of Connecticut, have invented a new and useful Improvement in Blanks for Axe-Bits; and I do hereby declare that the following is a full, clear, and exact description thereof, which will enable others skilled in the art to make and use the same, reference being had to the accompanying drawing, forming part of this specification.

This invention relates to improvements in blanks for the steel bits for axes and other edge-tools, designed to provide blanks of a form better calculated to fit and weld to the polls of axes and other tools which are narrower at the edge than at or toward the eye, previous to the wedging on of the blanks.

The invention consists in the manner of improving certain blanks described in the patent granted to Harvey Mann, June 3, 1862, No. 35,480, as hereinafter described.

Figures 1 to 4 represent the blanks formed according to the said Mann's patent, and their application to the polls of axes previous to and in the finished form or shape after welding.

Figures 5 to 8 represent the blanks formed according to my improvement, and their application to the polls of axes, previous to and in the finished form.

Figure 9 represents a front elevation of a set of rollers properly adjusted and located to do the work economically, each or both provided with grooves such as I employ for forming the blanks according to my improvement.

Similar letters of reference indicate corresponding parts.

The blanks A, as made by Mann, are formed by rolling steel bars into the form shown in cross-section in fig. 1, and then cutting the bars into the proper lengths, by any preferred means.

They are then bent into the form represented in fig. 2, preparatory to being applied to the polls for welding and finishing, as represented in fig. 3.

They are necessarily, for economy, cut from the bars at right angles thereto, making them, when bent into the form represented in fig. 2, as long between the points $a\ a$ as between the points $b\ b$.

When blanks of this form are applied to axe-polls B, which are narrowest at the bit, either the lips $d$ of the steel will fail to cover some parts of the sides of the polls, as at C, or the steel bits will project too much beyond the edges of the polls at D, if the blanks are made long enough to cover the polls at C; and if the bits be so extended, the axe will not finish into proper shape under the operation of hammering down to an edge, which spreads the bit at the same time that it is elongated, thereby causing the steel blanks, when so applied, to spread too much, and they require to be trimmed off, and this causes a large percentage of imperfect welds.

To provide for this spreading of the bits, and to insure the perfect welding of the blanks to the polls, the polls are necessarily made narrowest at the edge, as shown in fig. 3.

Efforts have been made to elongate the lips of the steel bits between the points $b\ b$, by hammering, to give to the ends thereof the requisite curvature to fit the polls, but without satisfactory results, as it is practically difficult to draw them evenly in this manner.

My invention consists in elongating the lips of these blanks, as represented at F, figs. 5 and 6, in the following manner:

I provide grooves E, in rollers adapted to the purpose, substantially as set forth in fig. 9, and so formed that the blanks A, between the points marked $x$ or thereabout, will fit snugly therein in passing through, but not so as to be altered in shape, while the parts from $x$ to $y$, on each side, will be sufficiently squeezed to elongate them as shown in fig. 5, which may be done, more or less, as required, for polls having various curvatures near the bits.

These blanks, when bent in the form represented in fig. 6, and applied to the polls (fig. 7) for welding and drawing, will cover the sides of the polls to the edges properly, and spread uniformly with the said polls.

Having thus described my invention,

What I claim as new, and desire to secure by Letters Patent, is—

The method herein described of elongating the lips of axe-bit blanks, for the purpose specified.

CHAS. BLAIR.

Witnesses:
OLIVER F. PERRY,
EDWARD H. SEARS.